US012591747B2

(12) United States Patent
Huo et al.

(10) Patent No.: US 12,591,747 B2
(45) Date of Patent: Mar. 31, 2026

(54) ENTITY-CONDITIONED SENTENCE GENERATION

(71) Applicant: International Business Machines Corporation, Armonk, NY (US)

(72) Inventors: Siyu Huo, Yorktown Heights, NY (US); Vatche Isahagian, Cambridge, MA (US); Vinod Muthusamy, Austin, TX (US); Praveen Venkateswaran, Cambridge, MA (US); Kushal Mukherjee, Gurgaon (IN); Jayachandu Bandlamudi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 18/129,882

(22) Filed: Apr. 2, 2023

(65) Prior Publication Data

US 2024/0330601 A1    Oct. 3, 2024

(51) Int. Cl.
| | |
|---|---|
| *G06F 40/40* | (2020.01) |
| *G06F 40/205* | (2020.01) |
| *G06F 40/289* | (2020.01) |
| *G06F 40/30* | (2020.01) |

(52) U.S. Cl.
CPC ............ *G06F 40/40* (2020.01); *G06F 40/205* (2020.01); *G06F 40/289* (2020.01); *G06F 40/30* (2020.01)

(58) Field of Classification Search
CPC ...... G06F 40/40; G06F 40/205; G06F 40/289;
G06F 40/30; G06F 40/247; G06N 3/08;
G06N 3/044; G06N 3/084; G06N 20/00;
G10L 15/20; G10L 15/063; G10L 15/197
See application file for complete search history.

(56) References Cited

U.S. PATENT DOCUMENTS

| | | | | |
|---|---|---|---|---|
| 10,423,665 B2 * | 9/2019 | Gupta | .................... | G06F 40/35 |
| 10,748,528 B2 * | 8/2020 | Itsui | ..................... | G06F 40/247 |
| 11,461,555 B2 | 10/2022 | Ekmekci et al. | | |
| 11,475,210 B2 * | 10/2022 | de Oliveira | ............. | G06N 3/08 |
| 11,797,776 B2 * | 10/2023 | Khetan | .................. | G06N 3/084 |
| 12,334,063 B1 * | 6/2025 | Xiao | .................... | G10L 15/063 |
| 2019/0080688 A1 * | 3/2019 | Itsui | ..................... | G10L 15/197 |
| 2021/0049628 A1 * | 2/2021 | Baird | ..................... | G06N 3/045 |
| 2022/0261555 A1 | 8/2022 | Lebanoff et al. | | |
| 2022/0375605 A1 * | 11/2022 | Lipton | .................... | G06F 40/30 |

(Continued)

OTHER PUBLICATIONS

Sam Witteveen, Martin Andrews ,"Paraphrasing with Large Language Models", arXiv:1911.09661v1 [cs.CL] Nov. 21, 2019 (Year: 2019).*

(Continued)

*Primary Examiner* — Paras D Shah
*Assistant Examiner* — Nadira Sultana
(74) *Attorney, Agent, or Firm* — Harrity & Harrity, LLP

(57) ABSTRACT

An example operation may include one or more of tuning a language model based on dependencies between an original data set and a paraphrase data set of the original data set, parsing and annotating the paraphrase dataset with entity identifiers of predefined entities to generate an annotated paraphrase dataset, additionally tuning the language model based on entity dependencies between the original data set and the paraphrase data set based on the annotated paraphrase dataset, and storing the additionally tuned language model in a storage device.

20 Claims, 11 Drawing Sheets

230

(56) References Cited

U.S. PATENT DOCUMENTS

| | | | | |
|---|---|---|---|---|
| 2023/0069935 A1* | 3/2023 | Choi | .................... | G06F 40/247 |
| 2023/0092702 A1* | 3/2023 | Mao | ........................ | G10L 15/20 |
| | | | | 704/9 |
| 2023/0098783 A1* | 3/2023 | Zaremoodi | ............ | G06N 3/044 |
| | | | | 704/243 |
| 2024/0232699 A1* | 7/2024 | Shanker | ................. | G06N 20/00 |
| 2024/0242022 A1* | 7/2024 | Yee | ........................ | G06F 40/174 |
| 2024/0296187 A1* | 9/2024 | Khan | .................... | G06F 16/906 |

OTHER PUBLICATIONS

Cao et al., "DivGAN: Towards Diverse Paraphrase Generation Via Diversified Generative Adversarial Network", Findings of the Association for Computational Linguistics: EMNLP 2020, pp. 2411-2421, published online by aclanthology.org on Nov. 2020.

Dong et al., "Injecting Entity Types Into Entity-Guided Text Generation", Proceedings of the 2021 Conference on Empirical Methods in Natural Language Processing, pp. 734-741, published online by aclanthology.org in November of 2021.

Pascual et al., "Directed Beam Search: Plug-And-Play Lexically Constrained Language Generation", arXiv.org (preprint), Computation and Language (cs.CL); Artificial Intelligence (cs.AI); Machine Learning (cs.LG), DOI: 10.48550/ARXIV.2012.15416, 9 pages, published as [v1] Thu, Dec. 31, 2020 03:05:44 UTC.

Sha, "Gradient-Guided Unsupervised Lexically Constrained Text Generation", Proceedings of the 2020 Conference on Empirical Methods in Natural Language Processing (EMNLP) 2020, pp. 8692-8703, published online by aclanthology.org on Oct. 20, 2022 at 01:21 UTC.

* cited by examiner

100

202

370

400                                    FIG. 4A
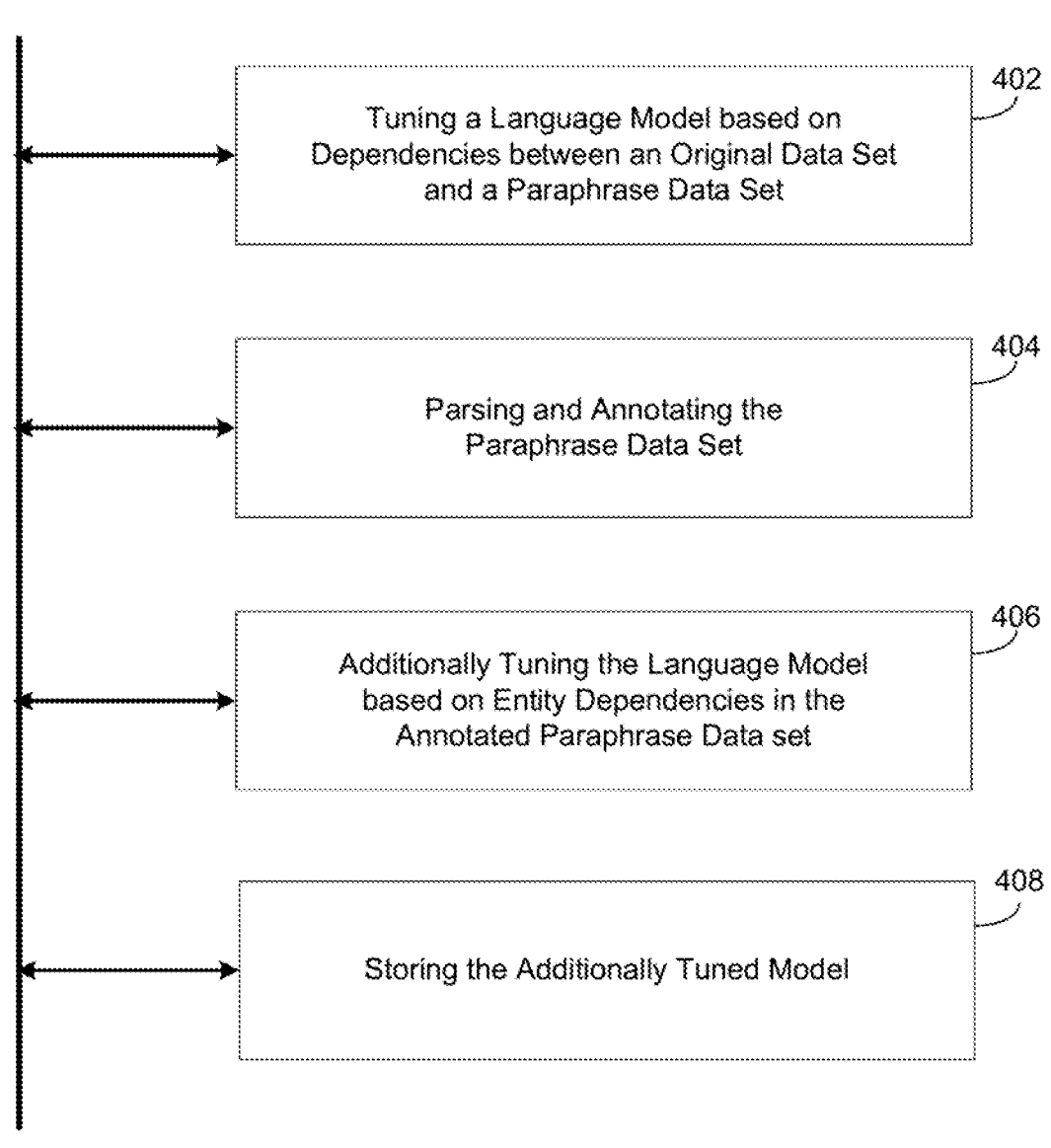

410                                FIG. 4B

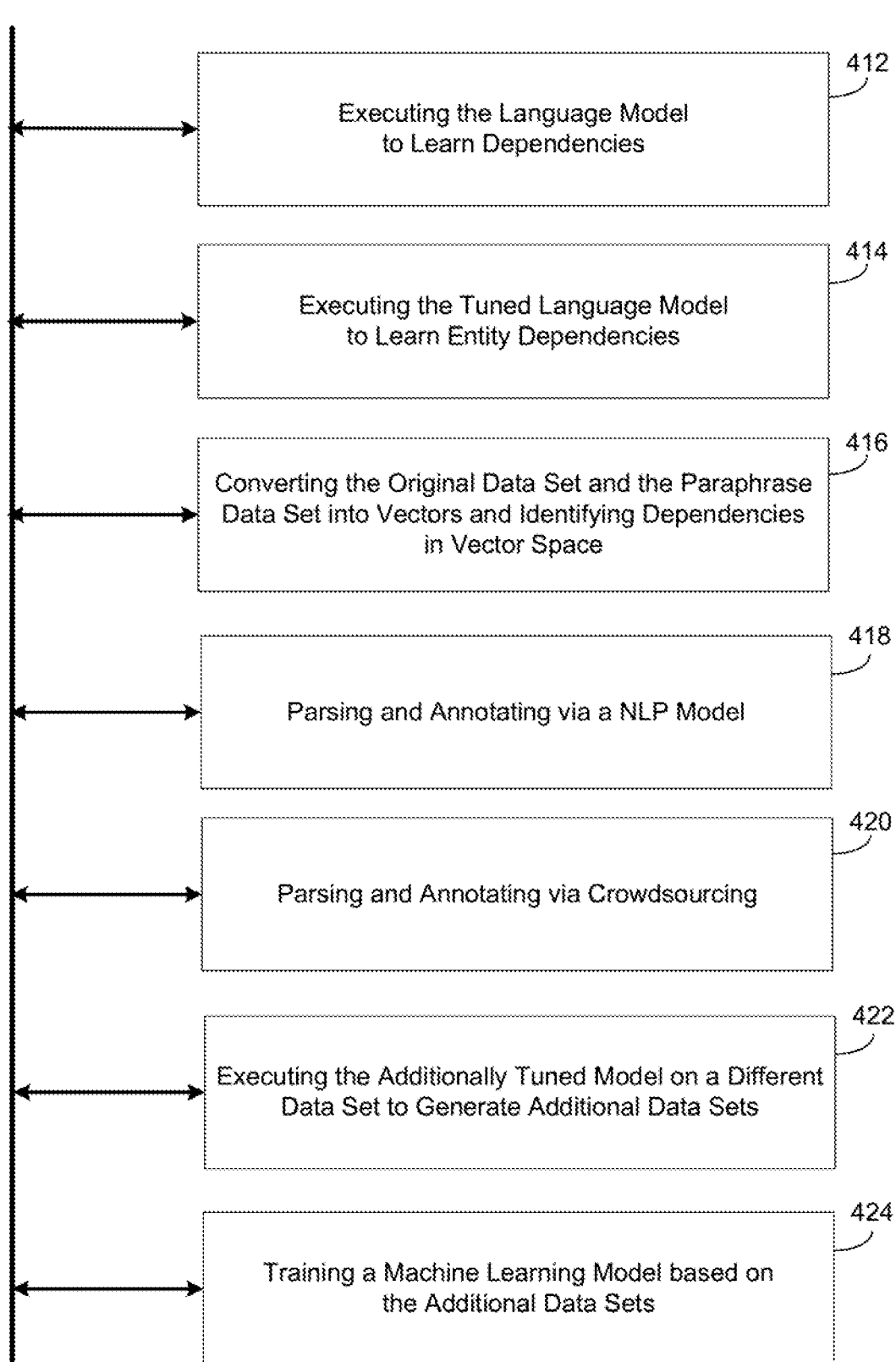

412
Executing the Language Model
to Learn Dependencies

414
Executing the Tuned Language Model
to Learn Entity Dependencies

416
Converting the Original Data Set and the Paraphrase
Data Set into Vectors and Identifying Dependencies
in Vector Space 418
Parsing and Annotating via a NLP Model 420
Parsing and Annotating via Crowdsourcing 422
Executing the Additionally Tuned Model on a Different
Data Set to Generate Additional Data Sets 424
Training a Machine Learning Model based on
the Additional Data Sets

ENTITY-CONDITIONED SENTENCE GENERATION

BACKGROUND

Machine learning models (i.e., language models) receive an input (such as a question) and provide an output (such as an answer). The language models are trained to understand the meaning and context of words and sentences. The accuracy of such language models is dependent on the quality of the training data that is used to train the language models.

SUMMARY

One example embodiment provides an apparatus that includes a storage device that may store a language model, and a processor that may tune the language model based on dependencies between an original data set and a paraphrase data set of the original data set, parse and annotate the paraphrase dataset with entity identifiers of predefined entities to generate an annotated paraphrase dataset, additionally tune the language model based on entity dependencies between the original data set and the paraphrase data set based on the annotated paraphrase dataset, and store the additionally tuned language model in a storage device.

Another example embodiment provides a method that includes one or more of tuning a language model based on dependencies between an original data set and a paraphrase data set of the original data set, parsing and annotating the paraphrase dataset with entity identifiers of predefined entities to generate an annotated paraphrase dataset, additionally tuning the language model based on entity dependencies between the original data set and the paraphrase data set based on the annotated paraphrase dataset, and storing the additionally tuned language model in a storage device.

A further example embodiment provides a computer-readable medium comprising instructions, that when read by a processor, cause the processor to perform one or more of tuning a language model based on dependencies between an original data set and a paraphrase data set of the original data set, parsing and annotating the paraphrase dataset with entity identifiers of predefined entities to generate an annotated paraphrase dataset, additionally tuning the language model based on entity dependencies between the original data set and the paraphrase data set based on the annotated paraphrase dataset, and storing the additionally tuned language model in a storage device.

BRIEF DESCRIPTION OF THE DRAWINGS

FIG. 4A is a diagram illustrating a method of training a machine learning model based on curriculum learning, according to example embodiments.

FIG. 4B is a diagram illustrating a method of training the machine learning model based on curriculum learning, according to other example embodiments.

DETAILED DESCRIPTION

Figure 1:
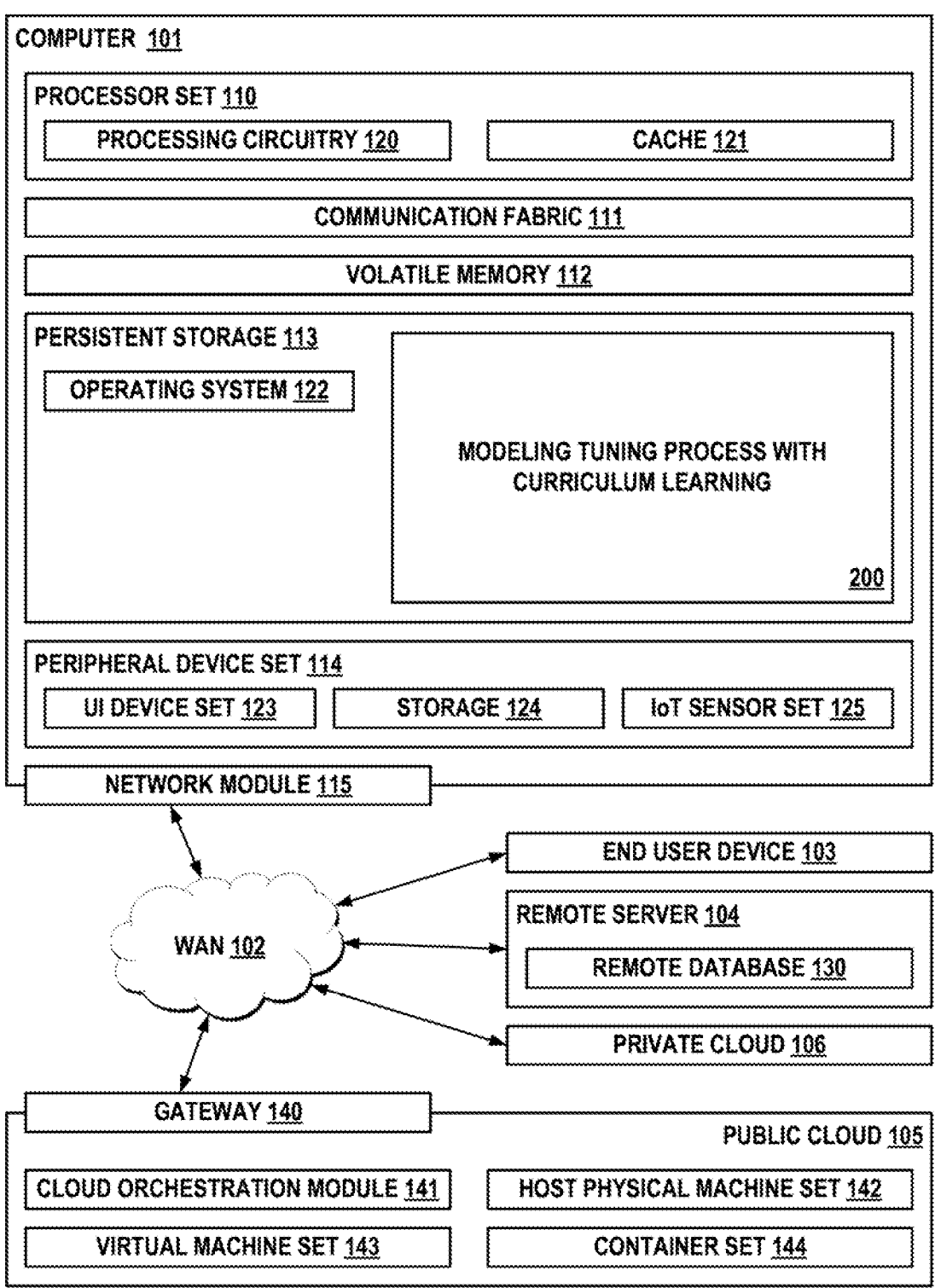
FIG. 1 depicts a computing environment, according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a training process for tuning a language model to paraphrase (i.e., generate sentences that preserve the meaning of an input sentence) while also retaining entity dependencies within the input sentence. This process involves a novel two-step tuning approach that initially tunes the model to paraphrase, and subsequently fine-tunes the language model to preserve entity-dependencies. In particular, the initial tuning process can be performed based on a training data set (set of original sentences) and paraphrases of the set of original sentences, which can be used to train the model to paraphrase. The subsequent tuning process can teach the model entity-dependencies between the original sentences and the paraphrased sentences. To do this, the paraphrased sentences can be annotated with entity identifiers that the model can learn from during the additional tuning process.

The additionally tuned model can be used to convert a training data set (e.g., a list of sentences, etc.) into a plurality of different training data sets that include paraphrased sentences of the list of sentences. Here, the model generates an additional sentence based on an original sentence based on entity dependencies in the original sentence, thereby preserving more of the context of the training data when generating the additional training data sets. This process creates more accurate training data samples, which will train a more accurate machine learning model in a shorter amount of time than lower-quality training data samples. Furthermore, the training data is generated automatically from an initial training data set, such as those available on public sites or the like.

The training process may be performed via software application or set of services hosted on a host platform such as a cloud platform, a web server, a database, an on-premises server, or the like. The language models that are used can vary. For example, the language model can be a newly generated language model or a language model that is already in existence, such as published language models available on the web.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for executing at least some of the computer code involved in performing the inventive methods, such as model tuning process with cumulative learning 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Paraphrasing within natural language processing is a process that includes receiving an input sentence and generating an output sentence that preserves the meaning of the input sentence with variations in words and grammar. In the example embodiments, a language model, which can be fine-tuned, generates paraphrased sentences from original sentences while preserving entity dependencies of the original sentences resulting in very high quality training sentences. One original sentence can be used to generate multiple different paraphrased sentences (e.g., two, five, ten, etc.). Therefore, the paraphrasing process described herein can increase the amount of training data for use in training a machine learning model such as a new language model.

Figure 2A:
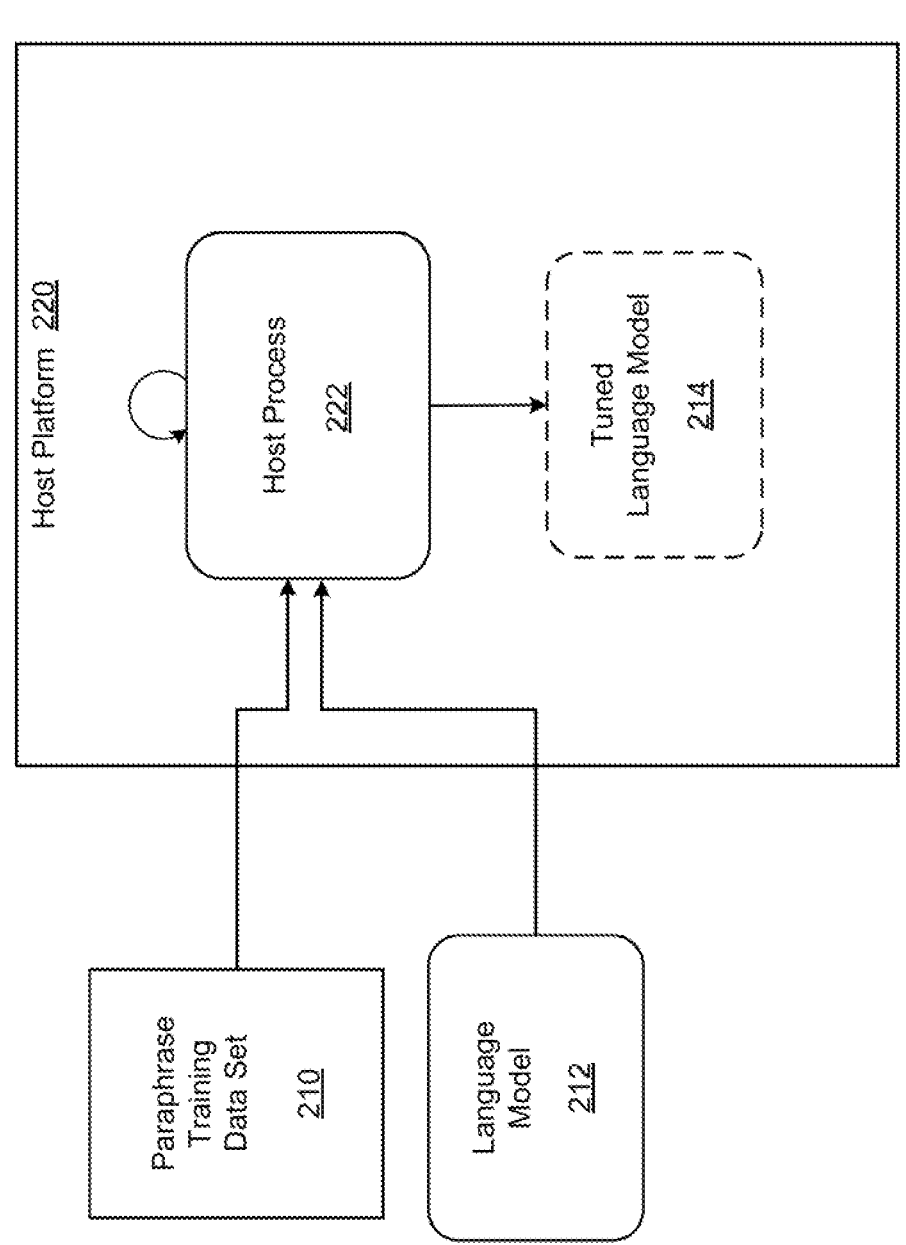
FIG. 2A is a diagram illustrating a process of tuning a language model based on a training data set, according to example embodiments.

FIG. 2A illustrates a process 202 of tuning a language model based on a paraphrase data set according to example embodiments. Referring to FIG. 2A, a language model 212, is trained (fine-tuned) to learn similarities between words and phrases based on a training data set that includes original sentences and paraphrased sentences generated from the original sentences. The training data set may include a set of sentences (e.g., dozens, hundreds, thousands, etc.) The language model may be refined by executing the language model on the training data, which causes the language model to learn semantic similarities between the original sentences and their corresponding paraphrased sentences.

However, the ability to paraphrase is not the only contribution of the system described herein. Another contribution is that the language model can be fine-tuned to preserve entity dependencies when generating the paraphrased sentences. This ensures that the variations in word choice are dependent on one another in the same manner that the original words in the original sentence are dependent on each other.

Referring to FIG. 2A, a host platform 220 hosts a host process 222, such as a software application, integrated development environment (IDE), combination thereof, or the like, which enables machine learning models to be trained. In this example, the host platform 220 may be a web server, a cloud platform, or the like. The host platform 220 trains a language model 212 to perform paraphrasing based on a paraphrase training data set 210 that can include a plurality of original sentences and a plurality of paraphrase sentences generated by paraphrasing the plurality of original sentences. For example, each original sentence may be provided with three or four paraphrased sentences. An example of such a data set is a PARANMT data set which is made publicly available on the Internet. As another option, a data set can be created manually or obtained from another source.

In FIG. 2A, the host platform 220 may execute the language model 212 on the paraphrase training data set 210 via the host process 222, resulting in the language model learning semantic dependencies between words in the original sentences and words in the corresponding paraphrased sentences. The result is a tuned language model 214.

Figure 2B:
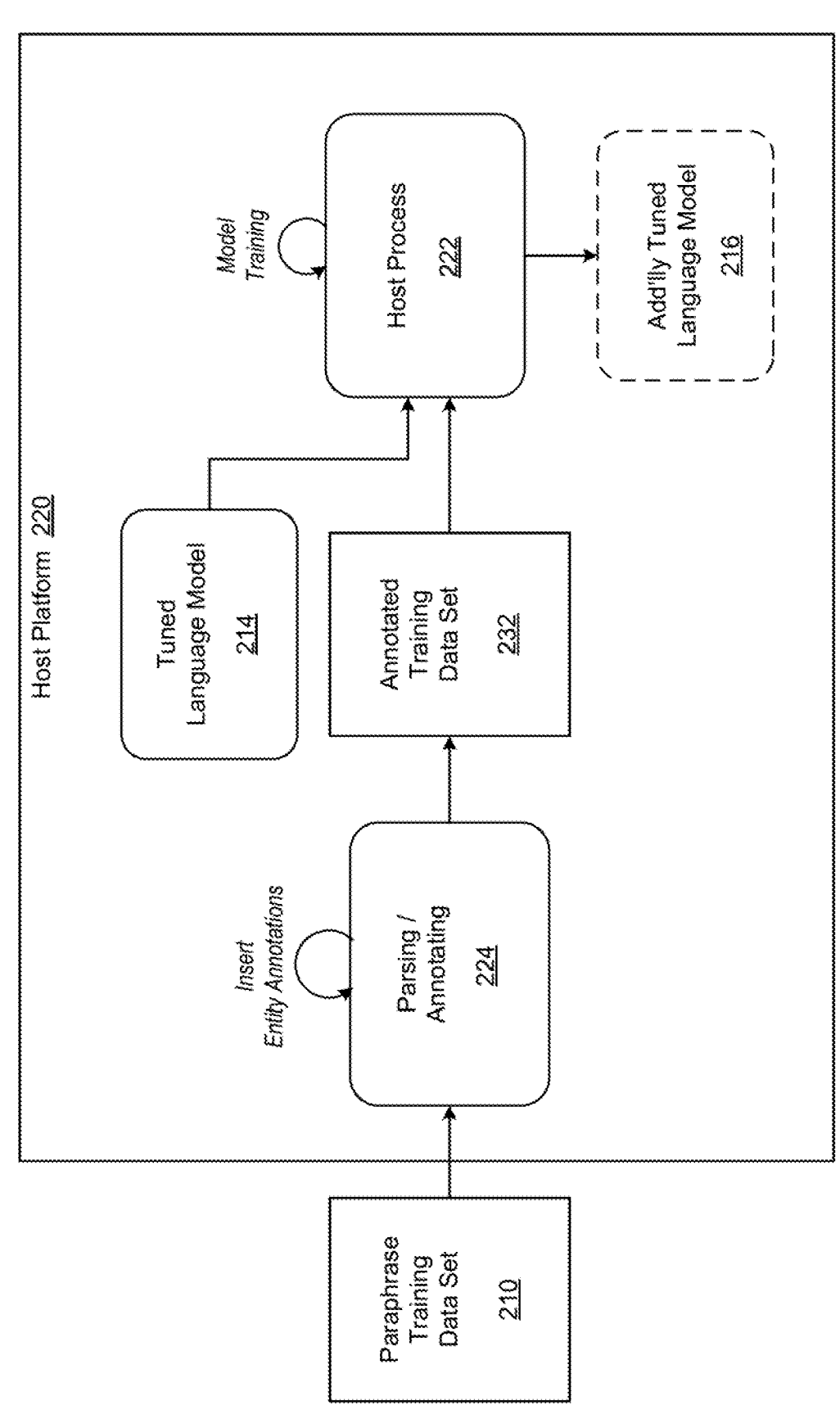
FIG. 2B is a diagram illustrating a process of additionally tuning the language model based on an annotated training data set, according to example embodiments.

FIG. 2B illustrates a process 230 of annotating a training data set with entity annotations according to example embodiments. Referring to FIG. 2B, the host platform 220 may convert the paraphrase training data set 210 to an annotated data set 232 via a parsing and annotating module 224, which can identify entities within the sentences (paraphrased sentences) and place labels or other identifiers on them. The entities may refer to nouns such as names, geographic locations, phone numbers, and the like.

The parsing and annotating module 224 may parse the paraphrased sentences in the training data set 210 and add annotations within the training data that identify the different entities in the paraphrased sentences. For example, the sentence "I started working at company A in 2022, and my email address is employee1@companyA.com". In this example, the words "company A", "2022", and "employee1@companyA.com" may be identified as entities. The parsing and annotating module 224 may tag or attach a flag or other notation to the words that identify the words as an entity and may identify the entities based on entity recognition libraries available to the public, and the like.

The same process may be repeated for each of the paraphrased sentences in the training data set 210, which are stored in the annotated training data set 232. The host process 222 may additionally tune the tuned language model 214 based on the annotated training data set 232. The host process 222 may iteratively execute the tuned language model 214 on the annotated training data set 232 to further learn entity dependencies between the paraphrased sentences in the annotated training data set 232 and the original sentences of the training data set 210, which may also be included in the annotated training data set 232. The result is an additional tuned language model 216.

Figure 2C:
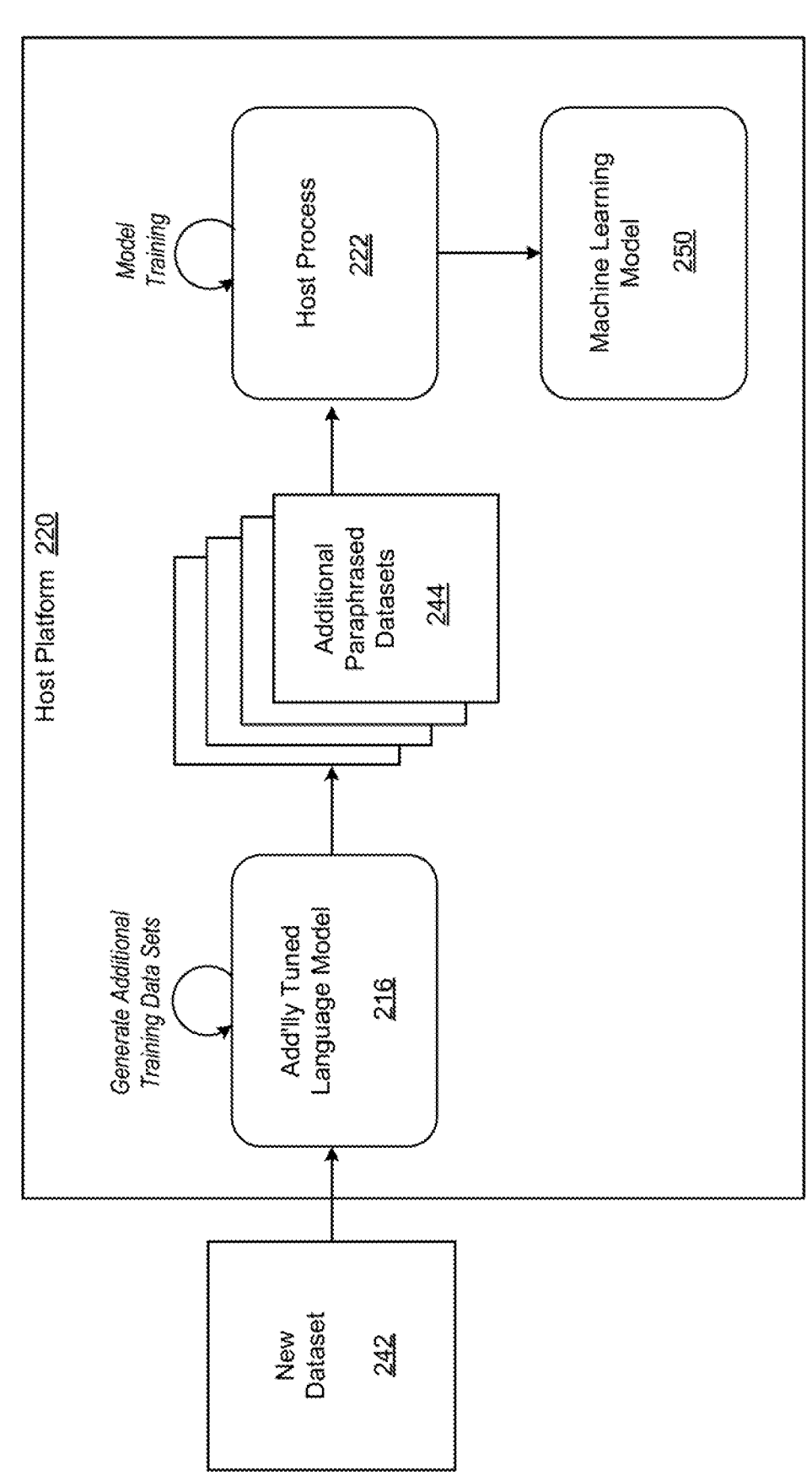
FIG. 2C is a diagram illustrating a process of generating training data based on the additional tuned language model and training a machine learning model based on the generated training data, according to example embodiments.

FIG. 2C illustrates a process 240 of generating training data based on the additional tuned language model and training a machine learning model based on the generated training data, according to example embodiments. Referring to FIG. 2C, the additional tuned language model 216 can be used to generate training data sets 244 for training a machine learning model 250. In this example, the additionally tuned language model 216 can receive an input that includes a new data set with original sentences. Here, the additionally tuned language model 216 can generate paraphrased sentences that include grammatical and syntactical correctness as well as preserve entity dependencies within the original sentence. The paraphrased sentences may be stored in the training data sets 244. Below is an example of converting a sentence into three different paraphrased sentences:

Input sentence="send a message to xxx@companyB.com"

Input Entity Constrains="123@gmail.com" and "abcd@companyB.com"

Paraphrase Sentence 1: "send an email to 123@gmail.com"

Paraphrase Sentence 2: "compose an email to abcd@companyB.com"

Paraphrase Sentence 3: "compose email for 123@gmail.com"

This same process may be repeated for each original sentence in a new data set 242, such as a data set provided by a user or a data set obtained from a public source. The result is a plurality of additional training data sets, 244 being generated. The number of training data sets 244 that are generated may depend on choice of the user, predefined conditions, available entities in the original sentences, etc. Furthermore, the host process may train a machine learning model 250 by executing an algorithm of the machine learning model 250 on the new data set 242, and the additional data sets 244 that are generated by the additional tuned language model 244. As a result, the model can be trained as if it is being trained with multiple different high quality training data sets that are generated from one single training data set.

Figure 3A:
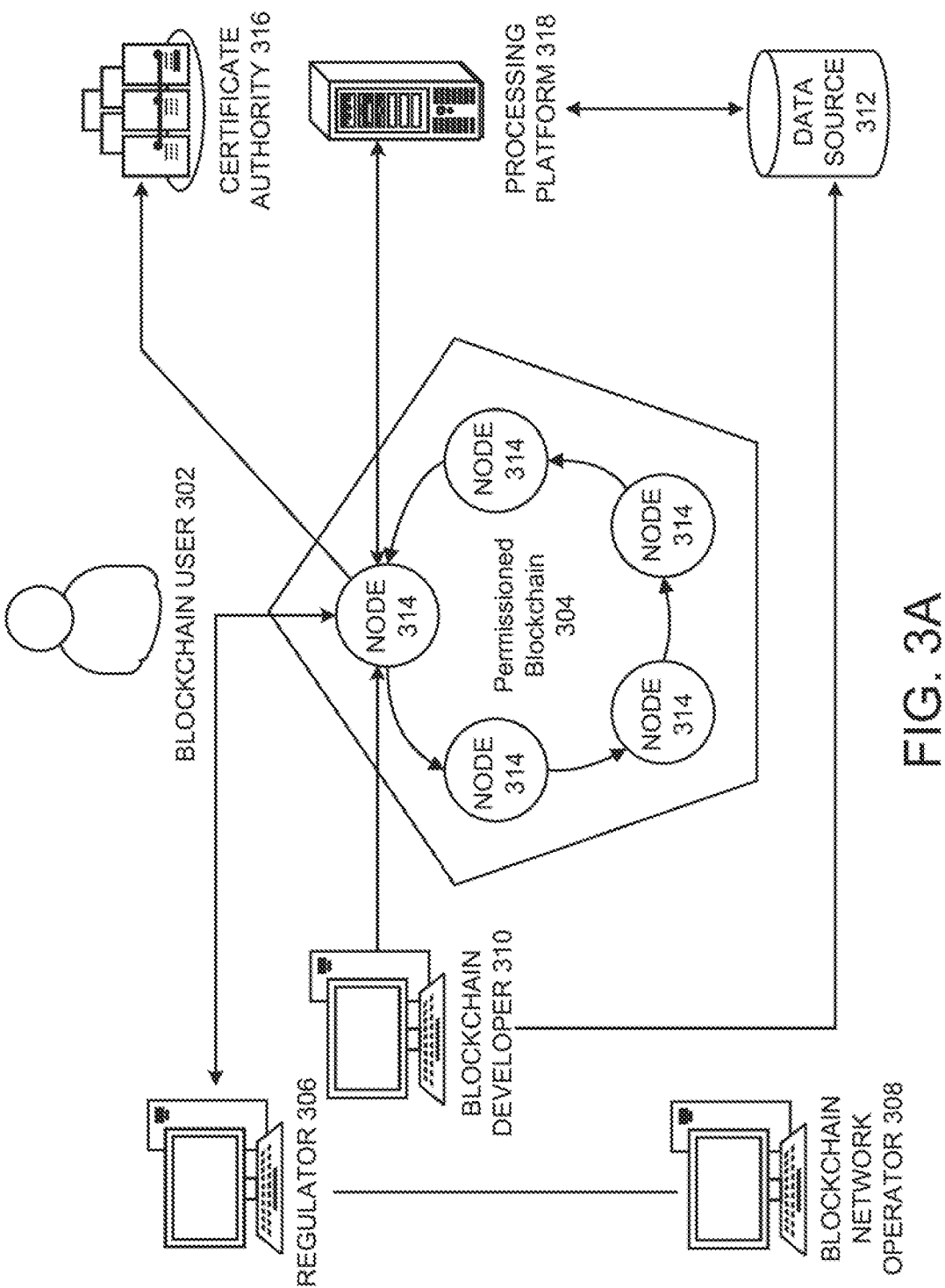
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
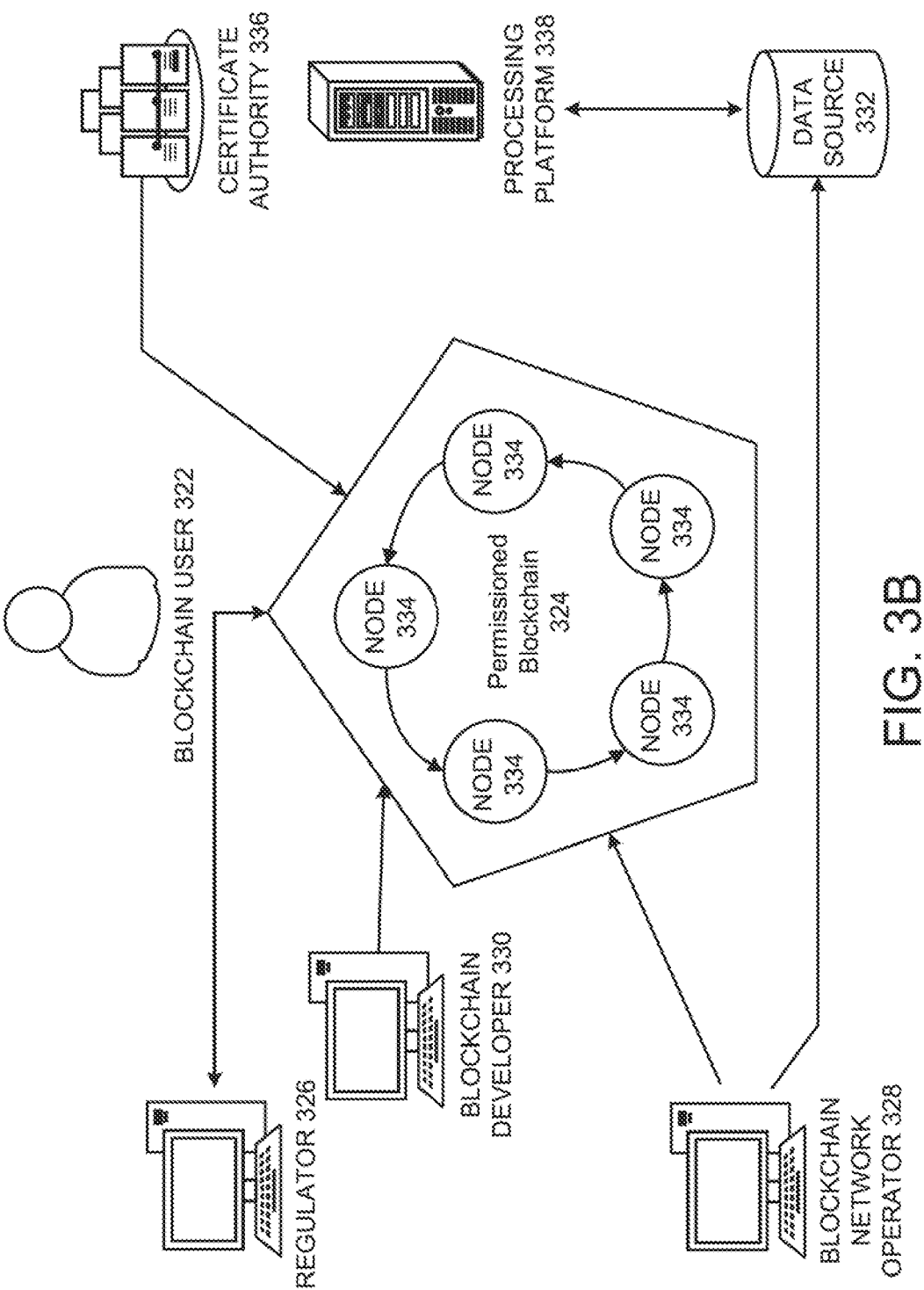
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain, a user may create a personal address and begin interacting with the network by submitting transactions and hence adding entries to the ledger. Additionally, all parties have the choice of running a node on the system and employing the mining protocols to help verify transactions.

Figure 3C:
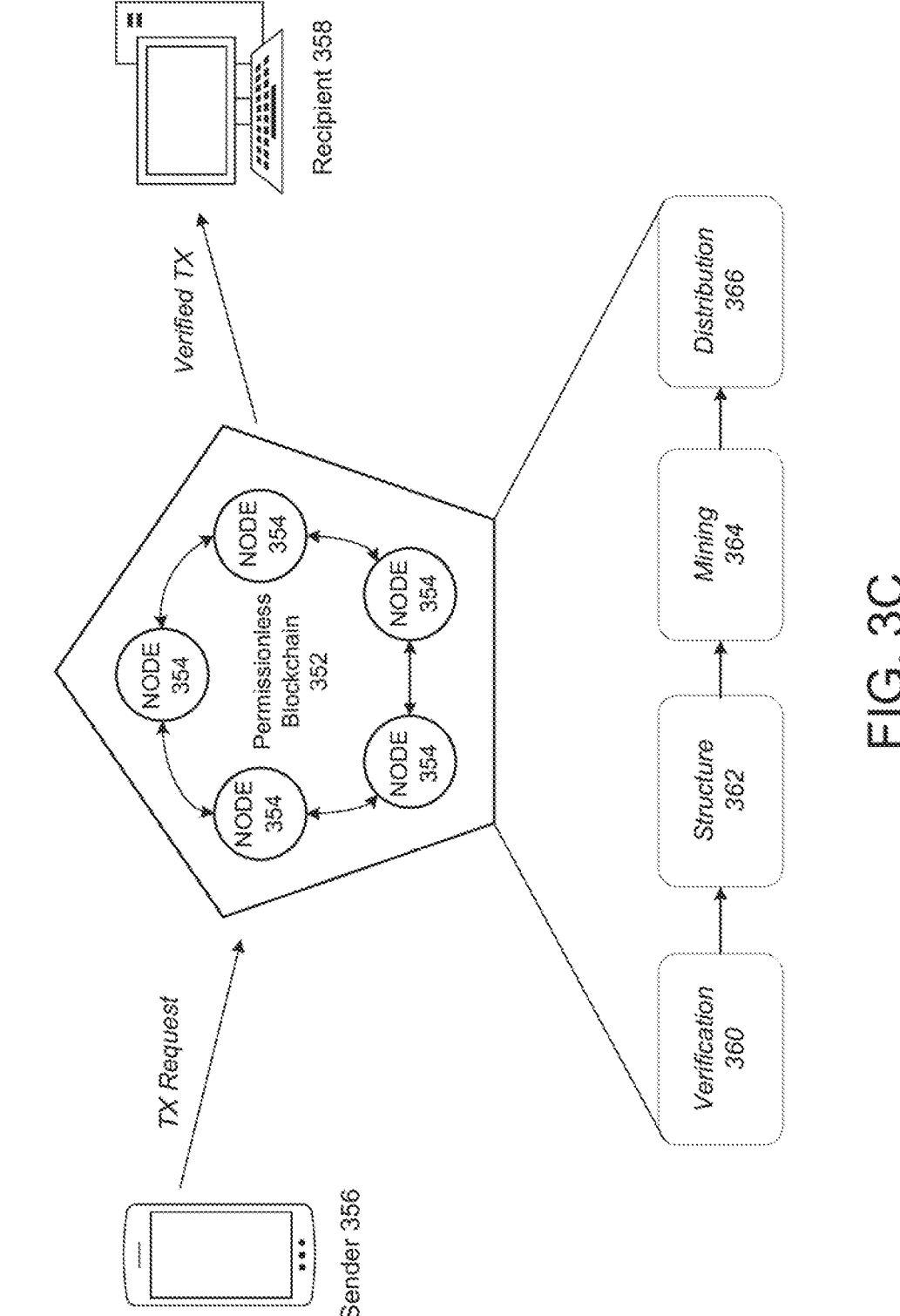
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately, or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
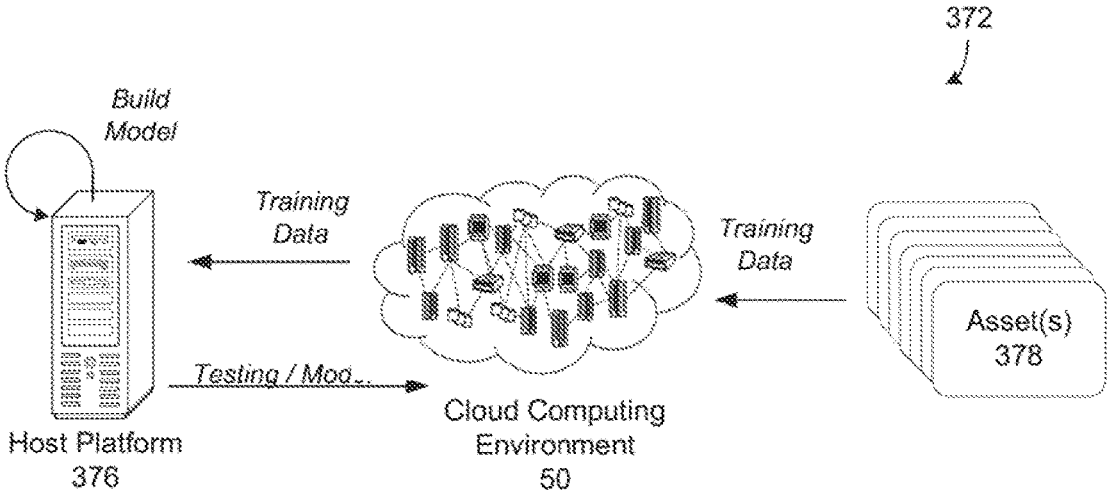
FIG. 3D is a diagram illustrating a machine learning process via a cloud computing platform, according to example embodiments.
Figure 3D:
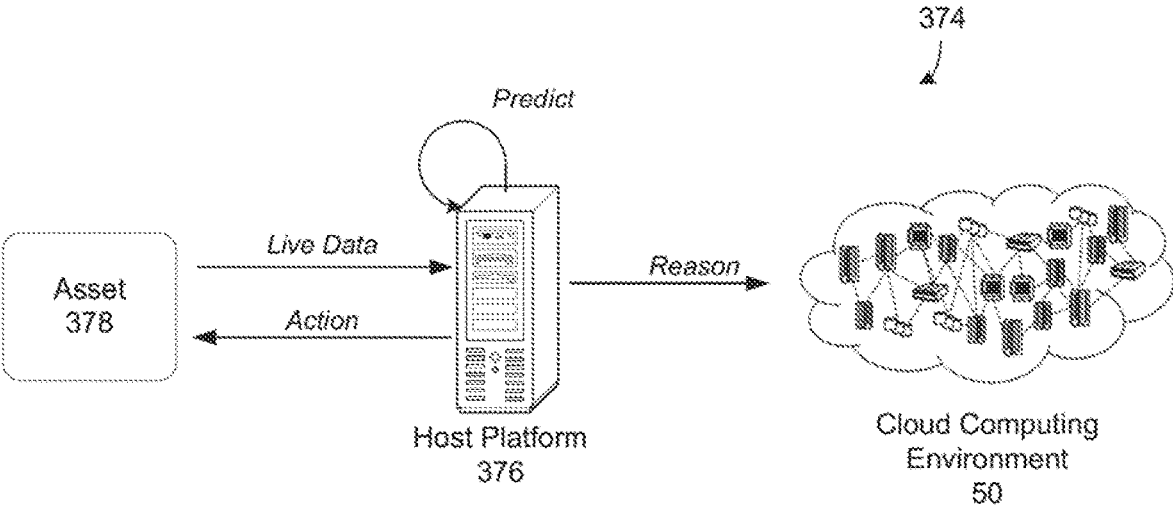
Figure 3E:
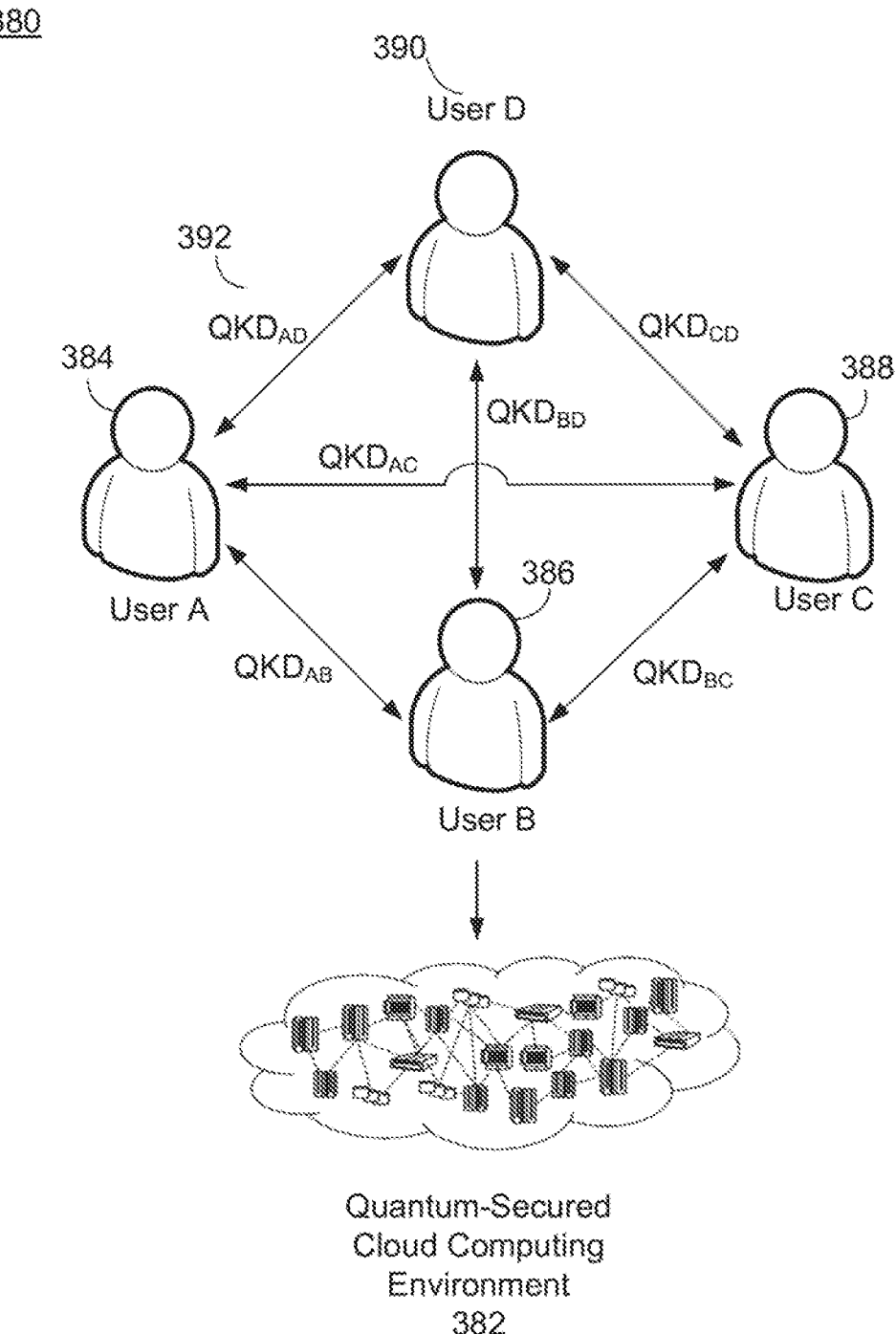
FIG. 3E is a diagram illustrating a quantum computing environment associated with a cloud computing platform, according to example embodiments.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.), such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver, through the cloud computing environment, can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

FIG. 4A illustrates a method 400 of training a machine learning model based on curriculum learning according to example embodiments, and FIG. 4B illustrates a method 410 of training the machine learning model based on curriculum learning according to other example embodiments. Referring to FIG. 4A, in step 402, the method may include tuning a language model based on dependencies between an original data set and a paraphrase data set of the original data set. The original data set may include a plurality of sentences, or a set of sentences, and the paraphrase data set may include paraphrases of the original sentences in the original data set. For example, each sentence may be mapped to one or more corresponding paraphrases of the respective sentence. In step 404, the method may include parsing and annotating the paraphrase dataset with entity identifiers of predefined entities to generate an annotated paraphrase dataset. In step 406, the method may include additionally tuning the language model based on entity dependencies between the original data set and the paraphrase data set based on the annotated paraphrase dataset. In step 408, the method may include storing the additionally tuned language model in a storage device.

Referring now to FIG. 4B, in step 412, the tuning may include executing the language model on the original data set and the paraphrase data set to learn dependencies between sentences that are included in the original data set and paraphrases that are included in the paraphrase data set. In step 414, the additional tuning may include iteratively executing the tuned language model on the annotated data set to identify entity dependencies between sentences included in the original data set and entities annotated within the annotated paraphrase data set. In step 416, the tuning may include converting the original data set into a first vector and the paraphrase data set into a second vector and identifying dependencies between vectorized sentences in the original data set and vectorized paraphrases in the paraphrase data set in vector space.

In step 418, the parsing and the annotating may be performed via execution of a natural language processing model. In step 420, the parsing and annotating may be performed based on crowdsourced feedback from a plurality of user devices. In step 422, the method further comprises executing the additionally tuned model on a different data set to generate a plurality of additional paraphrase data sets based on entities in the different data set. In step 424, the method may further include executing a machine learning model on the different data set and the plurality of additional paraphrase data sets to train the machine learning model, and store the trained machine learning model in the storage device.

The above embodiments may be implemented in hardware, in a computer program executed by a processor, in firmware, or in a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Although an exemplary embodiment of at least one of a system, method, and computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external, to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
   one or more processors; and
   one or more memory devices coupled to the one or more processors and configured to store a language model, wherein the one or more processors are configured to:
   tune the language model based on dependencies between an original data set and a paraphrase data set of the original data set, wherein the language model is a machine learning language model;

parse and annotate the paraphrase data set with entity identifiers of predefined entities to generate an annotated paraphrase data set;

iteratively execute the tuned language model on the annotated paraphrase data set to identify entity dependencies between sentences included in the original data set and entities annotated within the annotated paraphrase data set;

additionally tune the language model, by changing variables and weights of the language model, based on the entity dependencies between the original data set and the paraphrase data set based on the annotated paraphrase data set;

store the additionally tuned language model in the one or more memory devices; and execute the additionally tuned model on a different data set to generate a plurality of additional paraphrase data sets based on entities in the different data set.

2. The apparatus of claim 1,
wherein the one or more processors are further configured to:
  execute the language model on the original data set and the paraphrase data set to learn dependencies between sentences that are included in the original data set and paraphrases that are included in the paraphrase data set.

3. The apparatus of claim 1,
wherein the one or more processors are further configured to:
  convert the original data set into a first vector and the paraphrase data set into a second vector and identify dependencies between vectorized sentences in the original data set and vectorized paraphrases in the paraphrase data set in vector space.

4. The apparatus of claim 1,
wherein the one or more processors are further configured to:
  execute a natural language processing model on the paraphrase data set to annotate and parse the paraphrase data set.

5. The apparatus of claim 1,
wherein the one or more processors are further configured to:
  parse and annotate the paraphrase data set based on crowdsourced feedback from a plurality of user devices.

6. The apparatus of claim 1,
wherein the one or more processors are further configured to:
  execute a machine learning model on the different data set and the plurality of additional paraphrase data sets to train the machine learning model, and store the trained machine learning model in the one or more memory devices.

7. The apparatus of claim 1,
wherein the language model is stored on a blockchain.

8. A method, comprising:
tuning a language model based on dependencies between an original data set and a paraphrase data set of the original data set;
parsing and annotating the paraphrase data set with entity identifiers of predefined entities to generate an annotated paraphrase data set;
iteratively executing the tuned language model on the annotated paraphrase data set to identify entity dependencies between sentences included in the original data set and entities annotated within the annotated paraphrase data set;

additionally tuning the language model, by changing variables and weights of the language model, based on the entity dependencies between the original data set and the paraphrase data set based on the annotated paraphrase data set;

storing the additionally tuned language model in a storage device; and executing the additionally tuned model on a different data set to generate a plurality of additional paraphrase data sets based on entities in the different data set.

9. The method of claim 8,
wherein the tuning comprises executing the language model on the original data set and the paraphrase data set to learn dependencies between sentences that are included in the original data set and paraphrases that are included in the paraphrase data set.

10. The method of claim 8,
wherein the tuning comprises converting the original data set into a first vector and the paraphrase data set into a second vector and identifying dependencies between vectorized sentences in the original data set and vectorized paraphrases in the paraphrase data set in vector space.

11. The method of claim 8,
wherein the parsing and the annotating is performed via execution of a natural language processing model.

12. The method of claim 8,
wherein the parsing and annotating is performed based on crowdsourced feedback from a plurality of user devices.

13. The method of claim 8,
wherein the method comprises executing a machine learning model on the different data set and the plurality of additional paraphrase data sets to train the machine learning model, and store the trained machine learning model in the storage device.

14. The method of claim 8,
wherein the language model is stored on a blockchain.

15. A non-transitory computer-readable medium storing a set of instructions, the set of instructions comprising:
  one or more instructions that, when executed by one or more processors of a device, cause the device to:
    tune a language model based on dependencies between an original data set and a paraphrase data set of the original data set;
    parse and annotate the paraphrase data set with entity identifiers of predefined entities to generate an annotated paraphrase data set;
    iteratively execute the tuned language model on the annotated paraphrase data set to identify entity dependencies between sentences included in the original data set and entities annotated within the annotated paraphrase data set;
    additionally tune the language model, by changing variables and weights of the language model, based on the entity dependencies between the original data set and the paraphrase data set based on the annotated paraphrase data set;
    store the additionally tuned language model in a storage device; and
    execute the additionally tuned model on a different data set to generate a plurality of additional paraphrase data sets based on entities in the different data set.

16. The non-transitory computer-readable medium of claim 15, wherein the one or more instructions, to cause the device to tune the language model, cause the device to:

execute the language model on the original data set and the paraphrase data set to learn dependencies between sentences that are included in the original data set and paraphrases that are included in the paraphrase data set.

17. The non-transitory computer-readable medium of claim 15, wherein the one or more instructions, to cause the device to tune the language model, cause the device to:

convert the original data set into a first vector and the paraphrase data set into a second vector and identifying dependencies between vectorized sentences in the original data set and vectorized paraphrases in the paraphrase data set in vector space.

18. The non-transitory computer-readable medium of claim 15, wherein the one or more instructions further cause the device to:

execute a natural language processing model on the paraphrase data set to annotate and parse the paraphrase data set.

19. The non-transitory computer-readable medium of claim 15, wherein the one or more instructions further cause the device to:

parse and annotate the paraphrase data set based on crowdsourced feedback from a plurality of user devices.

20. The non-transitory computer-readable medium of claim 15, wherein the language model is stored on a blockchain.

\* \* \* \* \*